US011754700B2

(12) United States Patent
Lee et al.

(10) Patent No.: US 11,754,700 B2
(45) Date of Patent: Sep. 12, 2023

(54) ELECTRONIC DEVICE FOR DETECTING EXTERNAL OBJECT USING PLURALITY OF ARRAY ANTENNAS ARRANGED IN PLURALITY OF DIRECTIONS AND METHOD THEREOF

(71) Applicant: Samsung Electronics Co., Ltd., Suwon-si (KR)

(72) Inventors: Wuseong Lee, Suwon-si (KR); Minwook Kim, Suwon-si (KR); Taekyun Kim, Suwon-si (KR); Youngho Park, Suwon-si (KR); Youngbae Lee, Suwon-si (KR); Seungnyun Kim, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 17/261,403

(22) PCT Filed: Apr. 26, 2019

(86) PCT No.: PCT/KR2019/005073
§ 371 (c)(1),
(2) Date: Jan. 19, 2021

(87) PCT Pub. No.: WO2020/022617
PCT Pub. Date: Jan. 30, 2020

(65) Prior Publication Data
US 2021/0341594 A1 Nov. 4, 2021

(30) Foreign Application Priority Data
Jul. 27, 2018 (KR) .................... 10-2018-0087485

(51) Int. Cl.
*G01S 13/72* (2006.01)
*G01S 13/50* (2006.01)
*H01Q 21/20* (2006.01)

(52) U.S. Cl.
CPC ............ *G01S 13/723* (2013.01); *G01S 13/50* (2013.01); *H01Q 21/205* (2013.01)

(58) Field of Classification Search
None
See application file for complete search history.

(56) References Cited

U.S. PATENT DOCUMENTS 6,961,025 B1   11/2005   Chethik et al.
7,026,978 B2   4/2006    Okamura et al.
(Continued)

FOREIGN PATENT DOCUMENTS

EP   1 321 776 A1     6/2003
JP   2010-197138 A    9/2010
(Continued)

OTHER PUBLICATIONS

JP2010197138A translation (Year: 2010).*
(Continued)

*Primary Examiner* — Whitney Moore
(74) *Attorney, Agent, or Firm* — Jefferson IP Law, LLP

(57) ABSTRACT

An electronic device comprises a plurality of array antennas arranged in a plurality of directions, and a control circuit, wherein the control circuit may be set so as to determine a plurality of statuses corresponding to the plurality of directions outside of the electronic device by means of using the plurality of array antennas, deactivate at least one first array antenna if the status of the at least one first array antenna of the plurality of statuses satisfies a first designated condition, activate at least one second array antenna if the status of the at least one second array antenna of the plurality of statuses (Continued)

satisfies a second designated condition, and detect an external object by means of using the at least one second array antenna, when the at least one first array antenna is in a deactivated status.

16 Claims, 17 Drawing Sheets

(56) References Cited

U.S. PATENT DOCUMENTS

| | | |
|---|---|---|
| 10,199,746 B2 | 2/2019 | Kim |
| 2003/0112172 A1 | 6/2003 | Shinoda et al. |
| 2004/0125012 A1 | 7/2004 | Okamura et al. |
| 2014/0159958 A1 | 6/2014 | Haziza |
| 2017/0110790 A1 | 4/2017 | Kim |

FOREIGN PATENT DOCUMENTS

| | | |
|---|---|---|
| KR | 10-1316229 B1 | 10/2013 |
| KR | 10-1658470 B1 | 9/2016 |
| KR | 10-2017-0044504 A | 4/2017 |
| KR | 10-1839452 B1 | 3/2018 |

OTHER PUBLICATIONS

European Search Report dated Jun. 9, 2021, issued in European Application No. 19840903.9.
Korean Office Action dated Nov. 17, 2022, issued in Korean Patent Application No. 10-2018-0087485.

\* cited by examiner ical Field

Various embodiments disclosed in this specification relate to an electronic device for detecting a user depending on an external state using a plurality of antennas, and a method thereof.

BACKGROUND ART

Nowadays, as the artificial intelligence (AI) technology is applied to various electronic devices, a user may receive information desired by him/her through the electronic devices, regardless of time and place. For example, the user may search for information through the electronic devices installed in an indoor place such as a home or office. The electronic devices installed in an indoor place may frequently operate at a fixed location while being spaced apart from a user, and thus the electronic devices may detect the user's location and may provide information depending on the detected user's location.

DISCLOSURE

Technical Problem

An electronic device may detect a user's location by transmitting a signal having a radio frequency through an array antenna (or it may be referred to as an "antenna array") including a plurality of antennas and analyzing the signal reflected from the user. The electronic device may transmit a signal through a plurality of antennas arranged in all directions to detect a user. However, transmitting a signal in a direction in which the user is not detected may cause unnecessary power consumption.

Various embodiments disclosed in the specification are directed to solve the above-described problem by adjusting a plurality of antennas depending on a changeable external state, such as a location of a user or an electronic device.

Technical Solution

According to an embodiment disclosed in this specification, an electronic device may include a plurality of array antennas disposed in a plurality of directions and a control circuit. The control circuit may be configured to determine a plurality of states corresponding to the plurality of directions outside the electronic device, using the plurality of array antennas, to deactivate the one or more first array antennas when states of one or more first array antennas among the plurality of states satisfy a first specified condition, and to activate the one or more second array antennas when states of one or more second array antennas among the plurality of states satisfy a second specified condition, and to detect an external object, using the one or more second array antennas in a state where the one or more first array antennas are deactivated.

According to an embodiment disclosed in this specification, a method of an electronic device may include determining a plurality of states corresponding to the plurality of directions outside the electronic device, using a plurality of antennas, deactivating the one or more first antennas when states of one or more first antennas among the plurality of states satisfy a first specified condition, and activating the one or more second antennas when states of one or more second antennas among the plurality of states satisfy a second specified condition, and detecting an external object, using the one or more second antennas in a state where the one or more first antennas are deactivated.

According to an embodiment disclosed in this specification, an electronic device may include a plurality of antennas arranged in a plurality of directions and a control circuit. The control circuit may be configured to detect an external object, using the plurality of antennas, to adjust beams generated by the plurality of antennas not to overlap with one another when the external object is not detected within a first threshold distance, and to adjust at least part of beams generated by the plurality of antennas to overlap with one another when the external object is detected within the first threshold distance.

Advantageous Effects

According to various embodiments disclosed in the specification, an electronic device may reduce the power consumption required to detect a user's location while preventing deterioration of tracking performance for detecting the user's location in real time.

Besides, a variety of effects directly or indirectly understood through the specification may be provided.

With regard to description of drawings, the same or similar components will be marked by the same or similar reference signs.

MODE FOR INVENTION

Hereinafter, various embodiments of the disclosure will be described with reference to accompanying drawings. However, it should be understood that this is not intended to limit the disclosure to specific implementation forms and includes various modifications, equivalents, and/or alternatives of embodiments of the disclosure.

Figure 1:
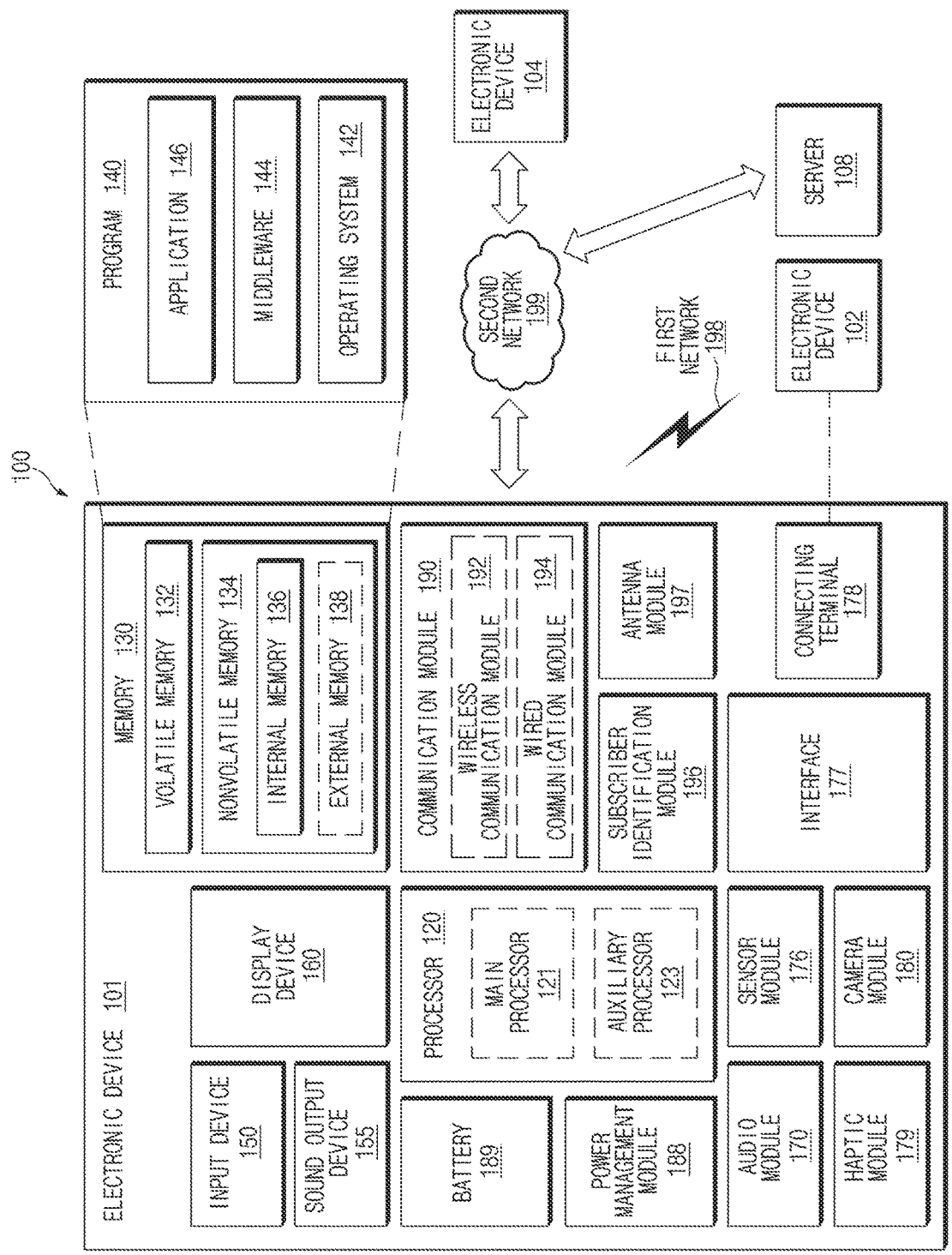
FIG. 1 is a block diagram of an electronic device in a network environment according to various embodiments.

FIG. 1 is a block diagram of an electronic device in a network environment according to various embodiments.

Referring to FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user of the electronic device 101 and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to an embodiment, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2:
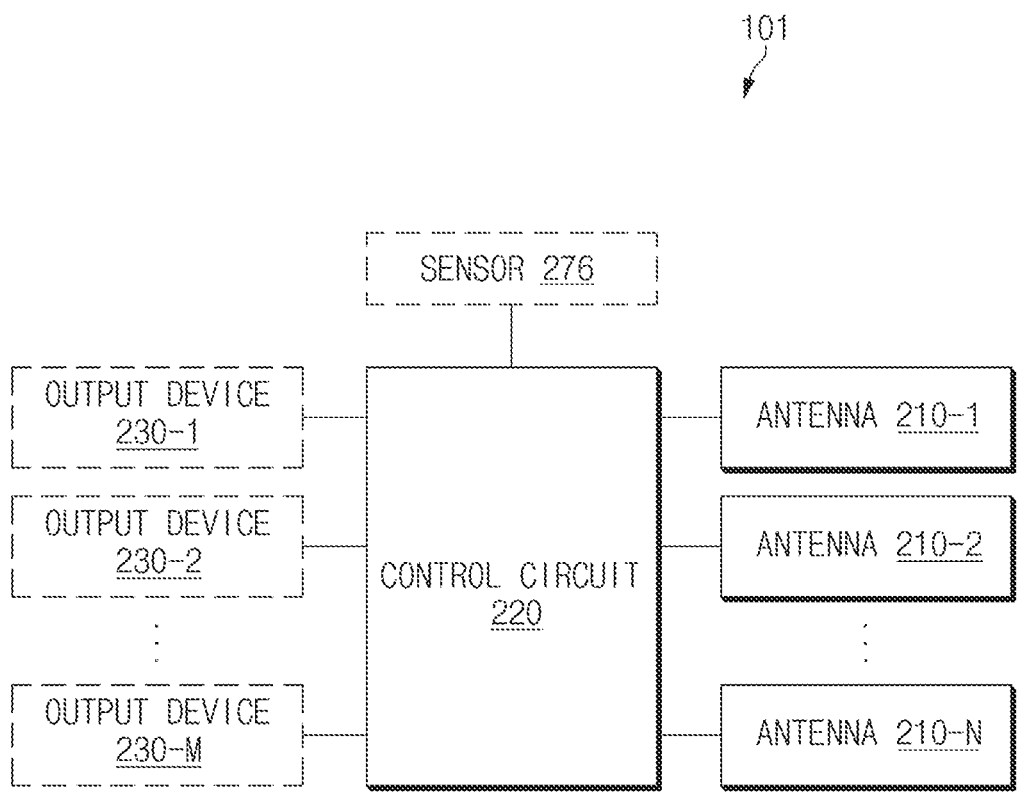
FIG. 2 is a block diagram of an electronic device for detecting an external object according to various embodiments.

FIG. 2 is a block diagram of the electronic device 101 for detecting an external object according to various embodiments.

Referring to FIG. 2, the electronic device 101 may include a control circuit 220 (e.g., the processor 120) and/or a plurality of antennas (210-1, 210-2, . . . , 210-N) (N is a natural number). According to an embodiment, the electronic device 101 may further include at least one of the components illustrated in FIG. 1, in addition to the components illustrated in FIG. 2.

According to an embodiment, the plurality of antennas (210-1, 210-2, . . . , 210-N) (e.g., array antennas) may be arranged to face a plurality of directions. The plurality of antennas (210-1, 210-2, . . . , 210-N) may radiate a signal used to detect an external object. For example, the plurality of antennas (210-1, 210-2, . . . , 210-N) may radiate a signal having a wide frequency bandwidth of 500 MHz or more, using an ultra-wide band (UWB) technology. Because the UWB technology-based signal has a wide frequency bandwidth and a pulse of the signal is short, the accuracy of location measurement may be high.

According to an embodiment, at least part of the plurality of antennas (210-1, 210-2, . . . , 210-N) may form an array antenna. According to an embodiment, each of the plurality of antennas (210-1, 210-2, . . . , 210-N) may form an array antenna; at least part of the plurality of antennas (210-1, 210-2, . . . , 210-N) may form an array antenna; the plurality of antennas (210-1, 210-2, . . . , 210-N) may form a single array antenna. The electronic device 101 may generate a beam (or an antenna beam) for detecting an external object through an array antenna. The beam may indicate a direction and/or a distance where the electronic device 101 detects an external object. For example, the electronic device 101 may determine the direction (e.g., the direction of the beam) in which antennas detect external objects, by controlling at least one of the index of the antenna radiating a signal or the phase of the signal radiating from an antenna among the plurality of antennas (210-1, 210-2, . . . , 210-N); the electronic device 101 may determine a detection range or detection angle (e.g., the width or area of a beam) in which antennas are capable of detecting an external object by controlling the number of antennas radiating a signal.

According to an embodiment, the control circuit 220 may be operatively connected to the plurality of antennas (210-1, 210-2, . . . , 210-N). The control circuit 220 may be at least part of the processor 120 of FIG. 1, or may be the same component as the processor 120. For example, the control circuit 220 may include at least one of CP or an AP.

According to an embodiment, the control circuit 220 may detect an external object outside the electronic device 101 in a plurality of directions, using the plurality of antennas (210-1, 210-2, . . . , 210-N). For example, the control circuit 220 may determine at least one antenna among the plurality of antennas (210-1, 210-2, . . . , 210-N) and may control the phase such that the determined antenna radiates a signal in a specified direction. When the radiated signal is reflected from an external object, the control circuit 220 may determine a direction, in which an antenna among at least one antenna receiving the reflected signal is arranged, as the direction in which the external object is positioned, and may determine a distance, by which the external object is spaced from the electronic device 101, based on the time received after the signal is radiated.

According to an embodiment, the control circuit 220 may selectively activate the plurality of antennas (210-1, 210-2, . . . , 210-N), based at least on a plurality of states corresponding to a plurality of directions of the outside of the electronic device 101. According to an embodiment, the plurality of states may be criteria for determining whether at least some antennas among the plurality of antennas (210-1, 210-2, . . . , 210-N) are deactivated or activated. For example, when there is an object (e.g., a wall), which a user is incapable of entering, in some of a plurality of directions, the control circuit 220 may deactivate antennas corresponding to the direction in which the object is located, and may activate the remaining antennas. The electronic device 101 may detect a user by activating some antennas, and thus may reduce power consumption. According to an embodiment, the control circuit 220 may determine antennas deactivated based on at least one of whether an external object is positioned at a distance where a user is incapable of being entered, or whether the detected external object is the user.

According to an embodiment, the control circuit 220 may adjust the beam pattern or the detection angle of antennas, based on at least one of whether an external object (e.g., a user) is detected in the direction corresponding to the activated antennas, whether the detected external object moves at the threshold speed or more, or whether the detected external object is located within a specified threshold distance from the electronic device 101. According to an embodiment, the pattern of a beam may include a case where the beams generated by antennas overlap with one another.

According to an embodiment, the electronic device 101 may further include at least one sensor 276 (e.g., at least part of the sensor module 176 of FIG. 1). The sensor 276 may detect whether at least one of the location or direction of the electronic device 101 is changed. The control circuit 220 may detect that at least one of the location or direction of the electronic device 101 is changed, through the sensor 276, and may re-determine a plurality of states through the plurality of antennas (210-1, 210-2, . . . , 210-N).

According to an embodiment, the electronic device 101 may further include a plurality of output devices (230-1, 230-2, . . . , 230-M) (M is a natural number) corresponding to a plurality of directions. For example, the plurality of output devices (230-1, 230-2, . . . , 230-M) may include at least one of the display device 160 of FIG. 1, the sound output device 155 of FIG. 1, the haptic module 179 of FIG. 1, or a light emitting device. The control circuit 220 may output information about activated or deactivated antennas, using the plurality of output devices (230-1, 230-2, . . . , 230-M).

Figure 3:
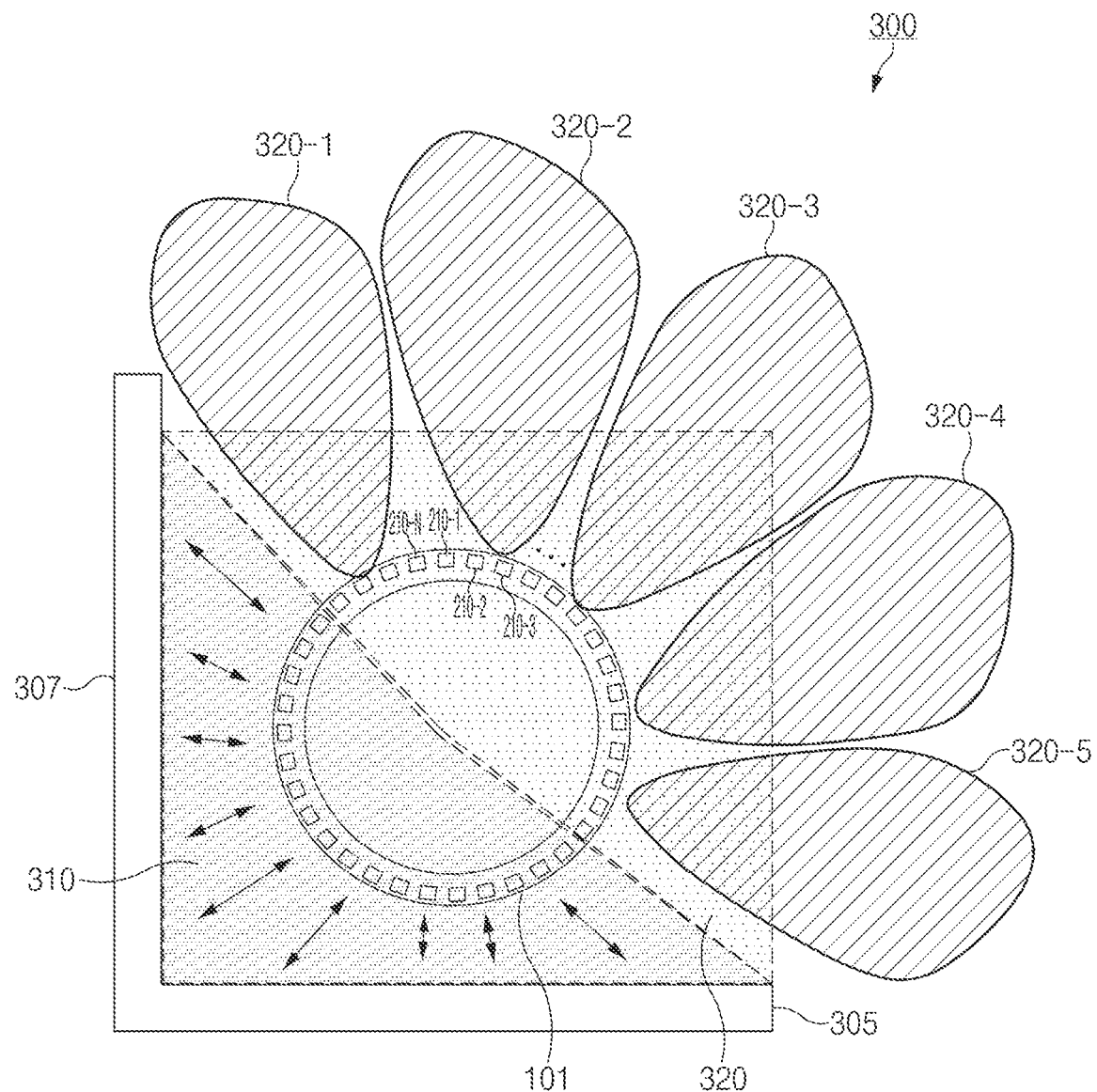
FIG. 3 is a view for describing an operation of an electronic device for activating antennas based on a plurality of states corresponding to a plurality of directions according to various embodiments.

FIG. 3 is a view for describing an operation of the electronic device 101 (e.g., the electronic device 102) for activating antennas based on a plurality of states corresponding to a plurality of directions according to various embodiments.

Referring to FIG. 3, in a network environment 300 (e.g., the network environment 100 of FIG. 1), the electronic device 101 may include the plurality of antennas (210-1, 210-2, . . . , 210-N) disposed in a plurality of directions. For convenience of description, FIG. 3 illustrates the electronic device 101 formed in a circular shape in two dimensions. However, the form of the electronic device 101 may be various forms capable of detecting an external object in all directions. The electronic device 101 may detect the external object in a specified direction (e.g., all directions) in 3D as well as 2D.

According to an embodiment, the electronic device 101 may identify (or determine) a plurality of states corresponding to a plurality of directions, using the plurality of antennas (210-1, 210-2, . . . , 210-N). For example, the electronic device 101 may identify a plurality of states by radiating signals in a plurality of directions and receiving at least part of the reflected signals among the radiating signals. For example, a plurality of states may include a case where an object other than the user is present within a proximity distance to the electronic device 101 or not. For example, the proximity distance may include a distance (e.g., 50 cm or 1 m) between the electronic device 101 and an object, where a user is incapable of being entered.

According to an embodiment, the electronic device 101 may determine whether an external object is present at the proximity distance to the electronic device 101, based at least on whether the radiated signal is received within a threshold time. For example, the external object may be a user, or other objects (e.g., obstacles that the user is not capable of entering, such as walls or tables) other than the user. According to an embodiment, high-frequency signals may be included in the signals reflected from the user due to the user's breathing or heart rate, and thus the electronic device 101 may determine whether an external object present at a proximity distance is a user (person) or an object other than the user, based on whether a high frequency signal is included in the reflected signal. For example, as illustrated in FIG. 3, the electronic device 101 may identify that a first object 305 (e.g., a wall) at the proximity distance to the electronic device 101 is present in one of a plurality of directions, and a second object 307 is present at proximity distance to the electronic device 101 in another direction.

According to an embodiment, the electronic device 101 may determine a region where antennas are deactivated, and a region where antennas are activated, based on a plurality of states. For example, the electronic device 101 may determine the region where the first object 305 and the second object 307 are present at the proximity distance to the electronic device 101, as a region (hereinafter, an inactive region 310) where antennas are deactivated, and may determine the remaining regions as a region (hereinafter, an active region 320) where antennas are activated.

According to an embodiment, the electronic device 101 may detect a user (e.g., 600 in FIG. 6) by activating second antennas corresponding to the active region 320 in a state where first antennas corresponding to the inactive region 310 are deactivated. For example, the electronic device 101 may detect the user, by forming beams (e.g., 320-1, 320-2, 320-3, 320-4, and 320-5) in directions corresponding to the active region 320. FIG. 3 illustrates only the embodiment in which beams are generated not to overlap with one another. However, the pattern and shape (e.g., area) of the beams generated in the active region 320 is not limited to the example illustrated in FIG. 3. The electronic device 101 may control at least one of a pattern or shape of beams according to the embodiments of FIGS. 6 to 12 to be described later.

Figure 4:
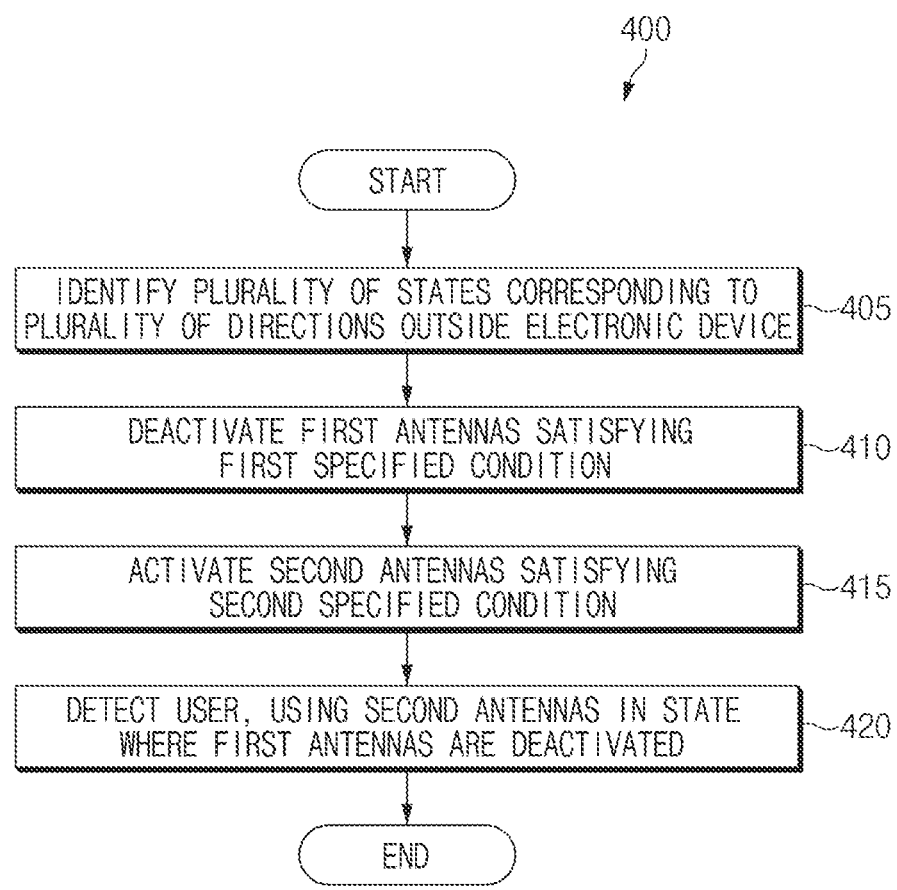
FIG. 4 is a flowchart illustrating an operation of an electronic device detecting a user based on a plurality of states corresponding to a plurality of directions according to various embodiments.

FIG. 4 is a flowchart illustrating an operation of the electronic device 101 detecting a user based on a plurality of states corresponding to a plurality of directions according to various embodiments. The operations illustrated in FIG. 4 may be performed by the electronic device 101 or the component (e.g., the control circuit 220) of the electronic device 101.

Referring to FIG. 4, in operation 405 of a method 400, the electronic device 101 may identify a plurality of states corresponding to a plurality of directions outside the electronic device 101 through the control circuit 220. The plurality of directions may include all directions surrounding the electronic device 101 in 2D or 3D.

In operation 410, the electronic device 101 may deactivate first antennas satisfying the first specified condition through the control circuit 220. For example, the first specified condition may include a case where an object (e.g., at least one of the first object 305 or the second object 307) other than the user is present at the proximity distance to the electronic device 101 in a direction corresponding to the first antennas.

In operation 415, the electronic device 101 may activate second antennas satisfying the second specified condition through the control circuit 220. For example, the second specified condition may include conditions other than the first specified condition. For example, the second specified condition may include a case where the detected external object is not present at a close distance or a case where the detected external object is a user (e.g., a person).

FIG. 4 illustrates an embodiment of performing operation 415 after the electronic device 101 performs operation 410. However, according to another embodiment, the electronic device 101 may perform operation 410 after performing operation 415.

In operation 420, the electronic device 101 may detect a user through the control circuit 220, using the second antennas in a state where the first antennas are deactivated. For example, the electronic device 101 may detect the user by generating a beam through the second antennas.

Through the above-described method, the electronic device 101 may reduce power consumption by deactivating some of the antennas.

Figure 5:
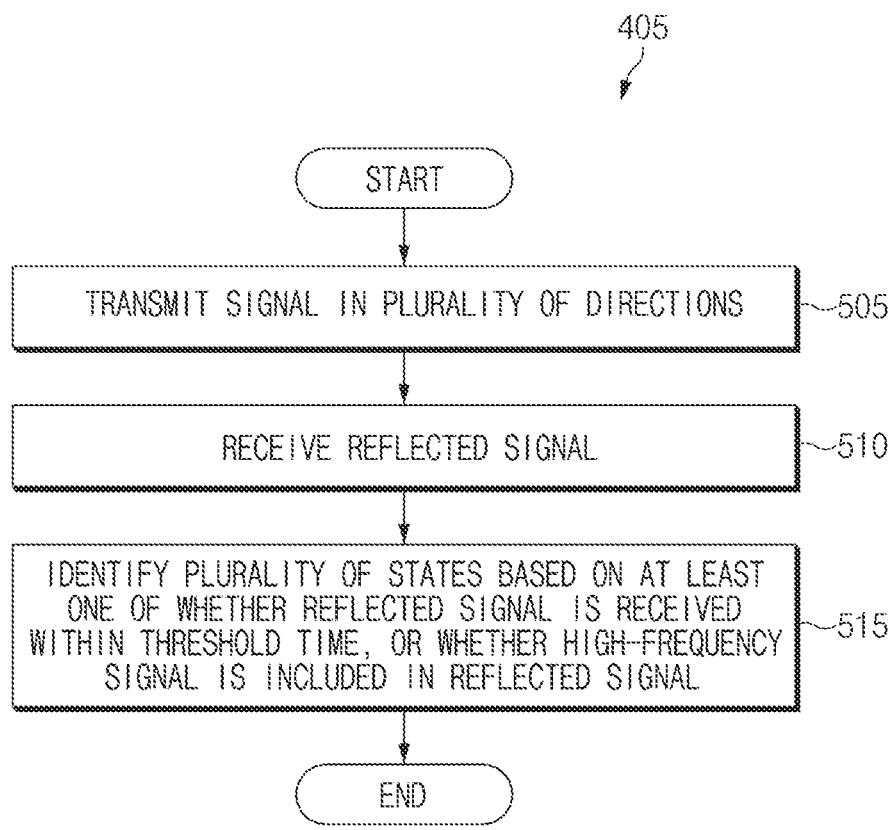
FIG. 5 is a flowchart illustrating an operation of an electronic device for identifying a plurality of states based at least on the reflected signal according to various embodiments.

FIG. 5 is a flowchart illustrating an operation of the electronic device 101 for identifying a plurality of states based at least on the reflected signal according to various embodiments. The operations of FIG. 5 may indicate that operation 405 of FIG. 4 is performed in detail.

Referring to FIG. 5, in operation 505, the electronic device 101 may transmit a signal in a plurality of directions, using the plurality of antennas (210-1, 210-2, ..., 210-N) through the control circuit 220. For example, the electronic device 101 may transmit a signal (e.g., a signal based on UWB technology) having a broadband frequency to increase the accuracy of measurement.

In operation 510, the electronic device 101 may receive the reflected signal among signals transmitted through the control circuit 220. The electronic device 101 may determine that an external object is present in a direction corresponding to the reflected signal.

In operation 515, the electronic device 101 may identify a plurality of states through the control circuit 220, based on at least one of whether the reflected signal is received within a threshold time, or whether a high-frequency signal is included in the reflected signal. When the reflected signal is received within the threshold time, the electronic device 101 may determine that an external object is present at a proximity distance to the electronic device 101. When the reflected signal is included in a high frequency signal, the electronic device 101 may determine that the detected external object is a user. When the external object present at the proximity distance is an object other than the user, the electronic device 101 may determine that antennas corresponding to the direction in which the external object is detected satisfy the first specified condition.

Figure 6:
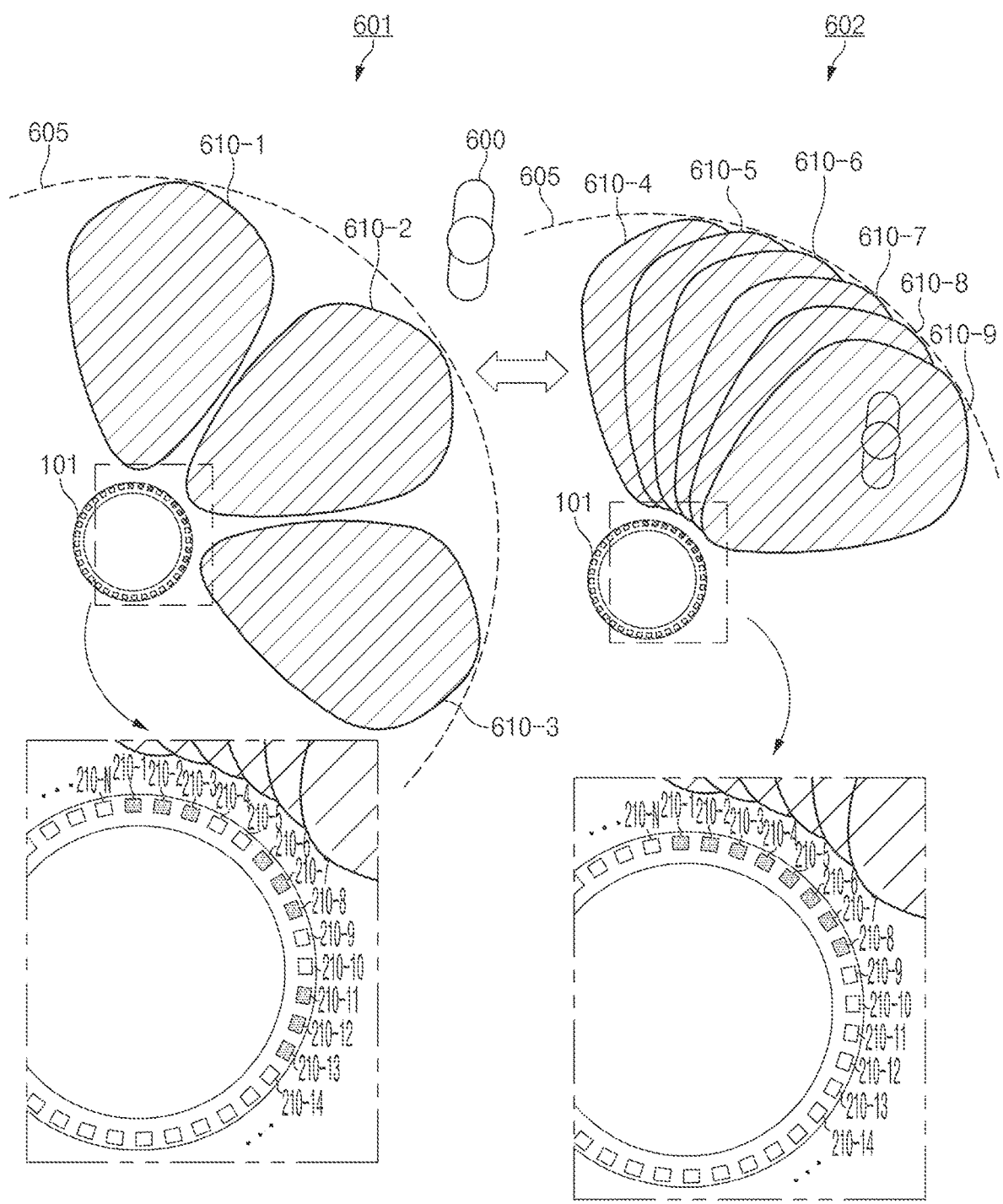
FIG. 6 is a view for describing an operation of adjusting a pattern of a beam generated by second antennas according to various embodiments.

FIG. 6 is a view for describing an operation of adjusting a pattern of a beam generated by second antennas according to various embodiments.

Referring to FIG. 6, the pattern of a beam may mean whether beams generated by the second antennas overlap with one another. For example, as in a first operation 601, the beams generated by the second antennas may not overlap with one another; as in a second operation 602, at least some of the beams may overlap with one another. The first operation 601 may be referred to as a sweep mode, and the second operation 602 may be referred to as a tracking mode.

According to an embodiment, when a user 600 is not detected within the specified first threshold distance 605 (e.g., a distance in the range of 6 meters), the electronic device 101 may control second antennas through the first operation 601 to increase power efficiency. For example, the electronic device 101 may control antennas 210-1, 210-2, and 210-3 among second antennas to generate a first antenna beam 610-1 corresponding to a first direction, may control antennas 210-6, 210-7, and 210-8 to generate a second antenna beam 610-2 corresponding to a second direction, and may control antennas 210-11, 210-12, and 210-13 to generate a third antenna beam 610-3 corresponding to a third direction. According to an embodiment, the first antenna beam 610-1, the second antenna beam 610-2, and the third antenna beam 610-3 may not overlap with one another. According to an embodiment, the electronic device 101 may generate beams sequentially or simultaneously. In the first operation 601, the electronic device 101 may exclude some antennas (e.g., an antenna (at least one of 210-4, 210-5, 210-9, or 210-10)), thereby reducing power consumption and computation amount.

According to an embodiment, when the user 600 is detected within the specified first threshold distance 605, the electronic device 101 may control the second antennas through the second operation 602 to more precisely track the location of the user 600. According to an embodiment, the electronic device 101 may select second antennas such that at least some of the beams overlap with one another. For example, the electronic device 101 may control antennas 210-1, 210-2, and 210-3 among the second antennas to detect a user in a direction corresponding to a fourth antenna beam 610-4 corresponding to the fourth direction; the electronic device 101 may control the antennas 210-2, 210-3, and 210-4 to detect the user, using a fifth antenna beam 610-5 that at least partially overlaps with the fourth antenna beam 610-4; the electronic device 101 may control the antennas 210-3, 210-4, and 210-5 to detect the user, using a sixth antenna beam 610-6 that at least partially overlaps with the fifth antenna beam 610-5; the electronic device 101 may control the antennas 210-4, 210-5, and 210-6 to detect the user, using a seventh antenna beam 610-7 that at least partially overlaps with the sixth antenna beam 610-6; the electronic device 101 may control the antennas 210-5, 210-6, and 210-7 to detect the user, using an eighth antenna beam 610-8 that at least partially overlaps with the seventh antenna beam 610-7; the electronic device 101 may control the antennas 210-6, 210-7, and 210-8 to detect the user, using a ninth antenna beam 610-9 that at least partially overlaps with the eighth antenna beam 610-7. According to an embodiment, the electronic device 101 may sequentially generate antenna beams. In a second operation 602, the electronic device 101 linearly moves the beams while overlapping at least part of the beams, and thus the user may perform more precisely tracking.

Figure 7:
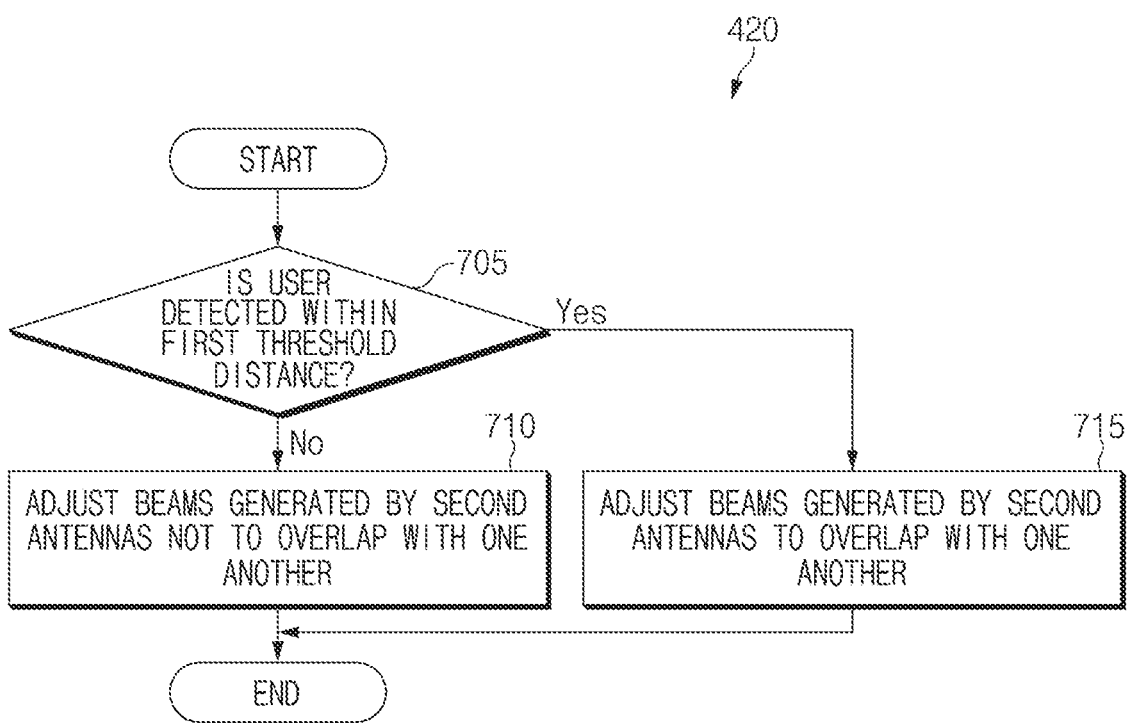
FIG. 7 illustrates a view for describing an operation of adjusting a pattern of a beam generated by second antennas depending on whether a user is detected within a first threshold distance, according to various embodiments.

FIG. 7 illustrates a view for describing an operation of adjusting a pattern of a beam generated by second antennas depending on whether the user 600 is detected within the first threshold distance 605, according to various embodiments. The operations illustrated in FIG. 7 may mean operations obtained by performing operation 420 of FIG. 4 in detail.

Referring to FIG. 7, in operation 705, the electronic device 101 may identify whether the user 600 is detected within the first threshold distance 605 (e.g., 6 m) through the control circuit 220. According to an embodiment, the electronic device 101 may identify the user's location based on a point in time when a signal transmitted through the second antennas is reflected and received, and a location (the arranged direction) of an antenna where the reflected signal is received. According to an embodiment, the electronic device 101 may determine whether the external object to which the signal is reflected is a user, based on whether a high-frequency signal is included in the reflected signal.

When the user 600 is not detected within the first threshold distance 605, in operation 710, the electronic device 101 may adjust (or control) the second antennas through the control circuit 220 such that the beams generated by the second antennas do not overlap with one another.

When the user 600 is detected within the first threshold distance 605, in operation 715, the electronic device 101 may adjust (or control) the second antennas through the control circuit 220 such that the beams generated by the second antennas at least partially overlap with one another.

Figure 8:
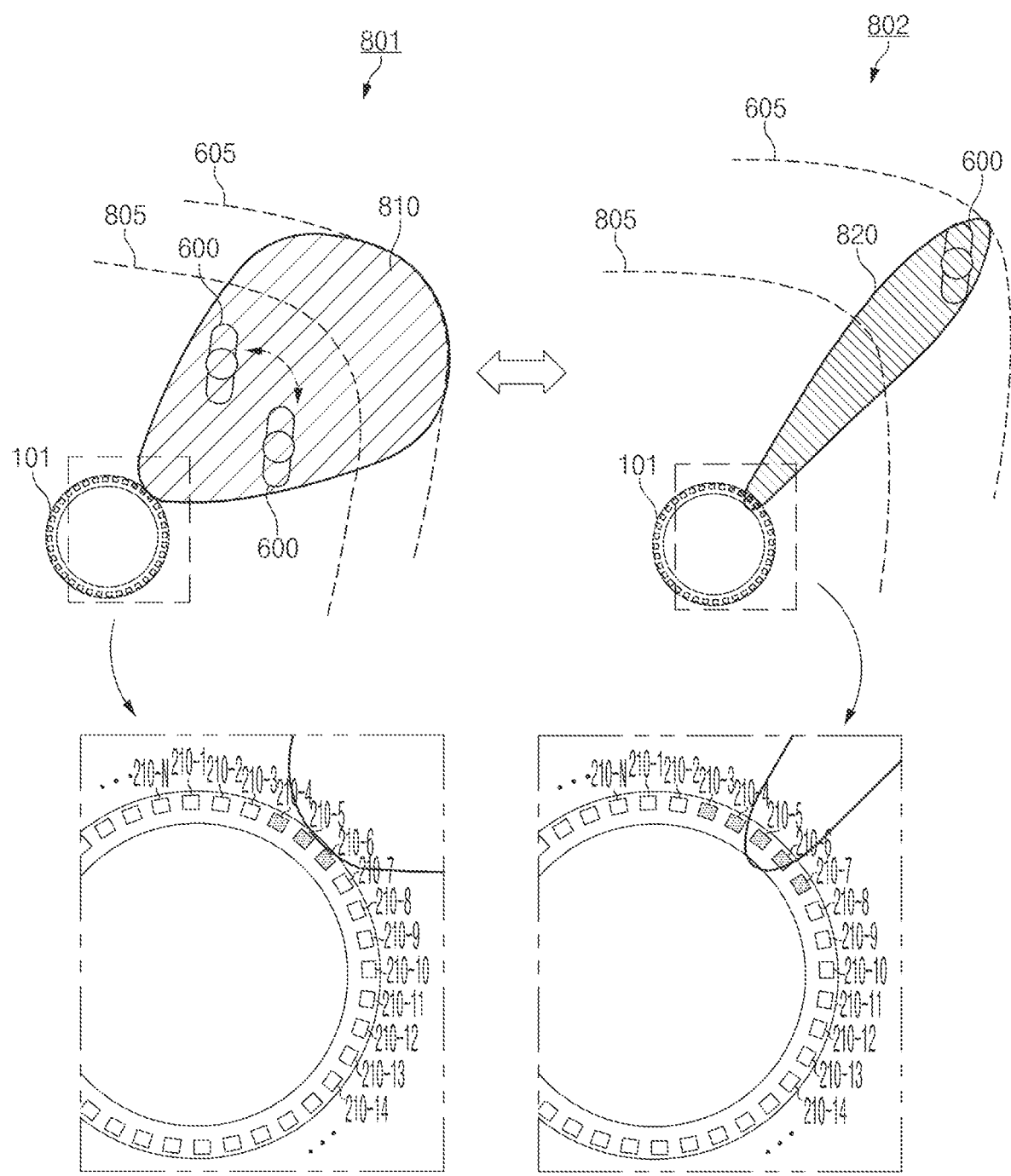
FIG. 8 illustrates an operation of adjusting a detection angle of second antennas according to various embodiments.

FIG. 8 illustrates an operation of adjusting a detection angle of second antennas according to various embodiments.

Referring to FIG. 8, the detection angle of the second antennas may include the width or area of a beam generated by the second antennas. As the number of second antennas generating a beam increases, the width of the beam (or the detection angle of second antennas) may decrease. A third operation 801 may include an operation of detecting a user with the detection angle being a first detection angle (e.g., a beam 810); a fourth operation 802 may include an operation of detecting the user 600 with a second detection angle (e.g., a beam 820) less than the first detection angle. The third operation 801 may be referred to as a high-efficiency mode; the fourth operation 802 may be referred to as a high-performance mode.

According to an embodiment, when the user 600 is detected within a second threshold distance 805 shorter than the first threshold distance 605, or when the user 600 moves at the threshold speed or more, the electronic device 101 may control the second antennas through the third operation 801. Because the first detection angle in the third operation 801 is greater than the second detection angle in the fourth operation 802 (e.g., because the area of a beam is wide), it may be easy to perform tracking of the user 600. Besides, in the third operation 801, the electronic device 101 may reduce the number of antennas generating beams as compared to the fourth operation 802, thereby reducing the computation amount, computation speed, and power consumption. For example, in the third operation 801, the electronic device 101 may generate the beam 810, using three antennas (e.g., 210-4, 210-5, and 210-6); in the fourth operation 802, the electronic device 101 may generate the beam 820, using five antennas (e.g., 210-3, 210-4, 210-5, 210-6, and 210-7). In each of the third operation 801 and the fourth operation 802 of FIG. 8, the number of antennas generating beams is only an example, and the embodiment is not limited to the illustrated number.

According to an embodiment, when the user 600 is positioned between the first threshold distance 605 and the second threshold distance 805, or when the user 600 moves at less than the threshold speed, the electronic device 101 may control the second antennas through the fourth operation 802. In the fourth operation 802, the electronic device 101 may increase the distance for detecting the user 600 by increasing the number of antennas generating beams compared to the third operation 801. Furthermore, the electronic device 101 may detect the user 600 more precisely by generating beams through more antennas than antennas in the third operation 801. For example, the electronic device 101 may analyze the heart rate or respiration volume of the user 600.

According to an embodiment, the electronic device 101 may selectively adjust the third operation 801 and the fourth operation 802. For example, when there is a need to reduce power consumption or to detect the user 600 more quickly, the electronic device 101 may control the antenna through the third operation 801. For another example, when the user 600 does not move, when the user 600 moves at less than a threshold speed, or when the electronic device 101 needs to measure the user 600 more precisely, the electronic device 101 may control the antenna through the fourth operation 802.

Figure 9:
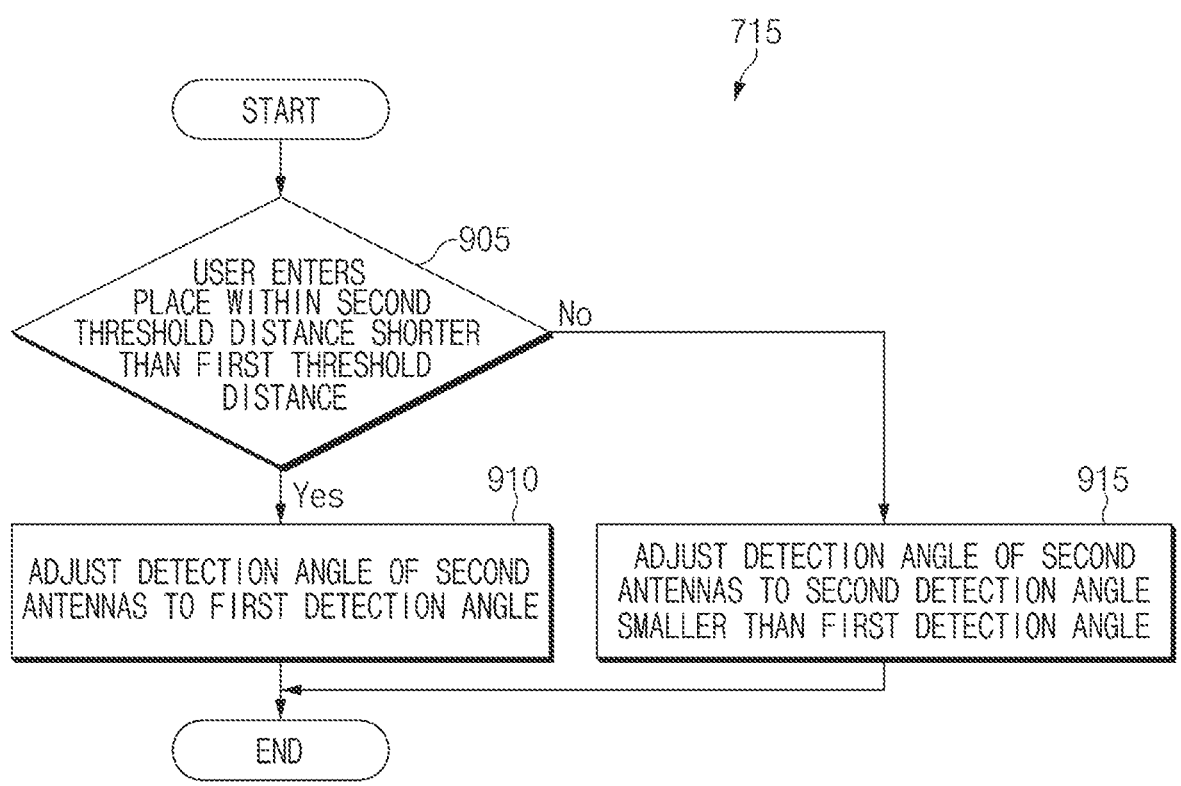
FIG. 9 illustrates a flowchart of an operation of an electronic device adjusting the detection angle of second antennas depending on the location of a user according to various embodiments.

FIG. 9 illustrates a flowchart of an operation of the electronic device 101 adjusting the detection angle of second antennas depending on the location of the user 600 according to various embodiments. The operations illustrated in FIG. 9 may mean operations obtained by performing operation 715 of FIG. 7 in detail.

Referring to FIG. 9, in operation 905, the electronic device 101 may determine whether the user 600 enters a place within the second threshold distance 805 shorter than the first threshold distance 605, through the control circuit 220.

When the user 600 enters a place within the second threshold distance 805, in operation 910, the electronic device 101 may adjust (or control) the detection angle of the second antennas to the first detection angle, through the control circuit 220.

When the user 600 does not enter a place within the second threshold distance 805, in operation 915, the electronic device 101 may adjust (or control) the detection angle of the second antennas to the second detection angle smaller than the first detection angle, through the control circuit 220.

Figure 10:
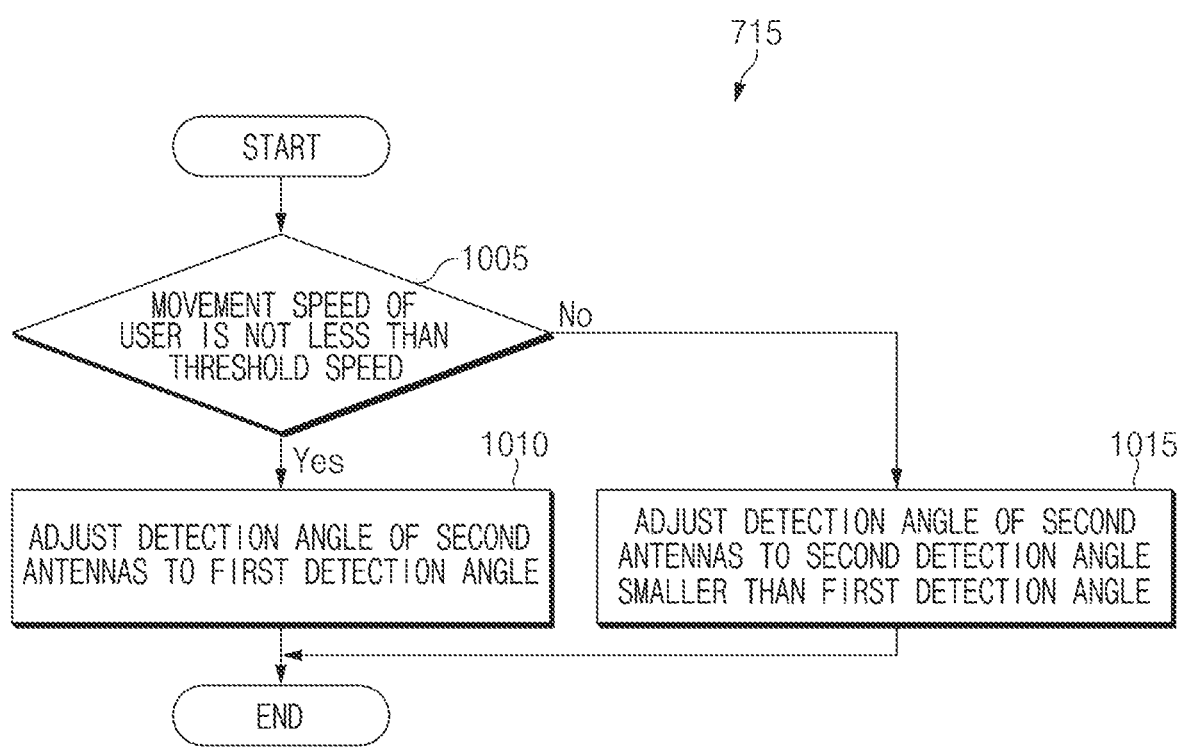
FIG. 10 illustrates a flowchart of an operation of an electronic device adjusting the detection angle of second antennas depending on the movement speed of a user according to various embodiments.

FIG. 10 illustrates a flowchart of an operation of the electronic device 101 adjusting the detection angle of second antennas depending on the movement speed of the user 600 according to various embodiments.

Referring to FIG. 10, in operation 1005, the electronic device 101 may determine whether the movement speed of the user 600 is not less than a threshold speed, through the control circuit 220.

When the movement speed is not less than the threshold speed, in operation 1010, the electronic device 101 may adjust (or control) the detection angle of the second antennas to the first detection angle, through the control circuit 220.

When the movement speed is less than the threshold speed, in operation 1015, the electronic device 101 may adjust (or control) the detection angle of the second antennas to the second detection angle smaller than the first detection angle, through the control circuit 220.

Figure 11:
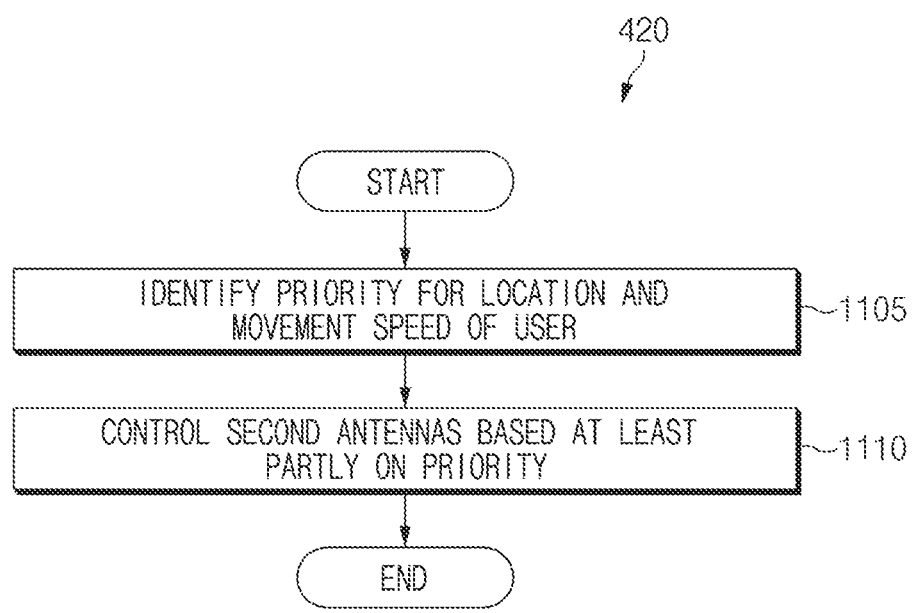
FIG. 11 illustrates a flowchart of an operation of an electronic device controlling second antennas based on the priority of the location and movement speed of a user according to various embodiments.

FIG. 11 illustrates a flowchart of an operation of the electronic device 101 controlling second antennas based on the priority of the location and movement speed of the user 600 according to various embodiments. The operations illustrated in FIG. 11 may mean operations obtained by performing operation 420 of FIG. 4 in detail.

Referring to FIG. 11, in operation 1105, the electronic device 101 may identify the priority for the location (e.g., at least one of direction or distance) and movement speed of the user 600 through the control circuit 220. For example, the priority may be determined by a user input, or the electronic device 101 may be updated by a usage history. For example, the electronic device 101 may set the priority for the location of the user 600 to be higher than the priority for the movement speed.

In operation 1110, the electronic device 101 may control the second antennas based at least partly on the identified priority through the control circuit 220. For example, in the case where the user 600 moves at less than the threshold speed within the second threshold distance 805, the electronic device 101 may control the second antennas through the third operation 801 when the priority for the location of the user 600 is higher than the priority for the movement speed, and the electronic device 101 may control the second antennas through the fourth operation 802 when the priority for movement speed is higher than the priority for the location of the user 600.

Through the above-described method, when there are a plurality of criteria (e.g., the location and movement speed of the user 600) for determining the third operation 801 and the fourth operation 802, the electronic device 101 may control the second antennas based on the priority of each criterion.

Figure 12:
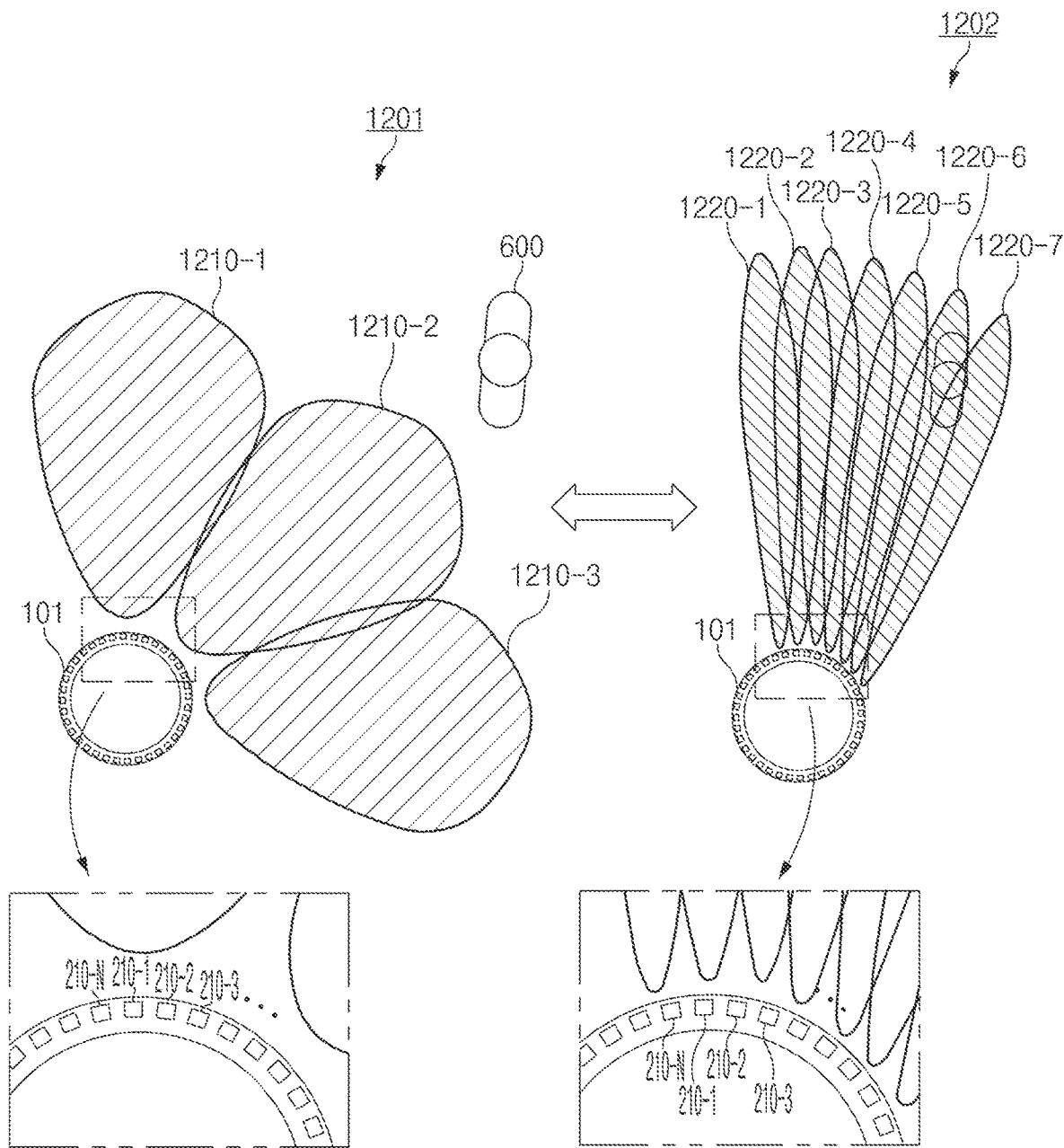
FIG. 12 illustrates an operation of simultaneously adjusting a pattern of a beam and a detection angle according to various embodiments.

FIGS. 6 to 11 described above illustrate an embodiment of adjusting the detection angle after the electronic device 101 adjusts the pattern of a beam. However, the electronic device 101 may adjust the detection angle simultaneously with the pattern of a beam, or may adjust the detection angle more preferentially than the pattern of the beam. For another example, the electronic device 101 may adjust only the detection angle and may not adjust the pattern of the beam, based on at least one of the movement speed of the user 600 or whether the user 600 enters a place within the second threshold distance 805. FIG. 12 illustrates an operation of simultaneously adjusting a pattern of a beam and a detection angle according to various embodiments.

Referring to FIG. 12, a fifth operation 1201 may mean an operation in which the electronic device 101 controls second antennas through the first operation 601 and the third operation 801; a sixth operation 1202 may mean an operation in which the electronic device 101 controls the second antennas through the second operation 602 and the fourth operation 802. For example, when the user 600 is not detected or is detected at the first threshold distance 605 or more, the electronic device 101 may control the second antennas such that beams (e.g., 1210-1, 1210-2, and 1210-3) having a first detection angle do not overlap with one another. The electronic device 101 may generate beams 1210-1, 1210-2, and 1210-3 simultaneously or sequentially. For another example, when the user 600 is detected within the first threshold distance 605, the electronic device 101 may control the second antennas such that beams (e.g., 1220-1, 1220-2, 1220-3, 1220-4, 1220-5, 1220-6, and 1220-7) having a second detection angle at least partially overlap with one another.

According to an embodiment, as illustrated in Table 1 below, the electronic device 101 may control the second antennas based on at least one of the location or movement speed of the user 600.

TABLE 1

|  | First operation | Second operation | Third operation | Fourth operation |
|---|---|---|---|---|
| When user is not detected | 1 | 0 | 1 | 0 |
| When user is detected | 0 | 1 | 0 | 1 |
| When user is close | 0 | 1 | 1 | 0 |
| Movement speed is less than threshold speed | 0 | 1 | 0 | 1 |
| Movement speed is not less than threshold speed | 0 | 1 | 1 | 0 |

In Table 1, '1' may indicate that the corresponding operation is activated, and '0' may indicate that the corresponding operation is deactivated.

According to an embodiment, the electronic device 101 (or the processor 120) may control the operations of antennas for substantially identical or similar directions to be changed through a time division method. For example, the electronic device 101 may generate at least one beam (e.g., at least one of 1210-1, 1210-2, or 1210-3) having a first detection angle and beams (e.g., at least one of 1220-1, 1220-2, 1220-3, 1220-4, 1220-5, 1220-6, or 1220-7) having a second detection angle at a specified period. The electronic device 101 may detect a user located at a short distance and a user located at a remote distance together by changing the operation of antennas for substantially identical or similar directions.

Figure 13:
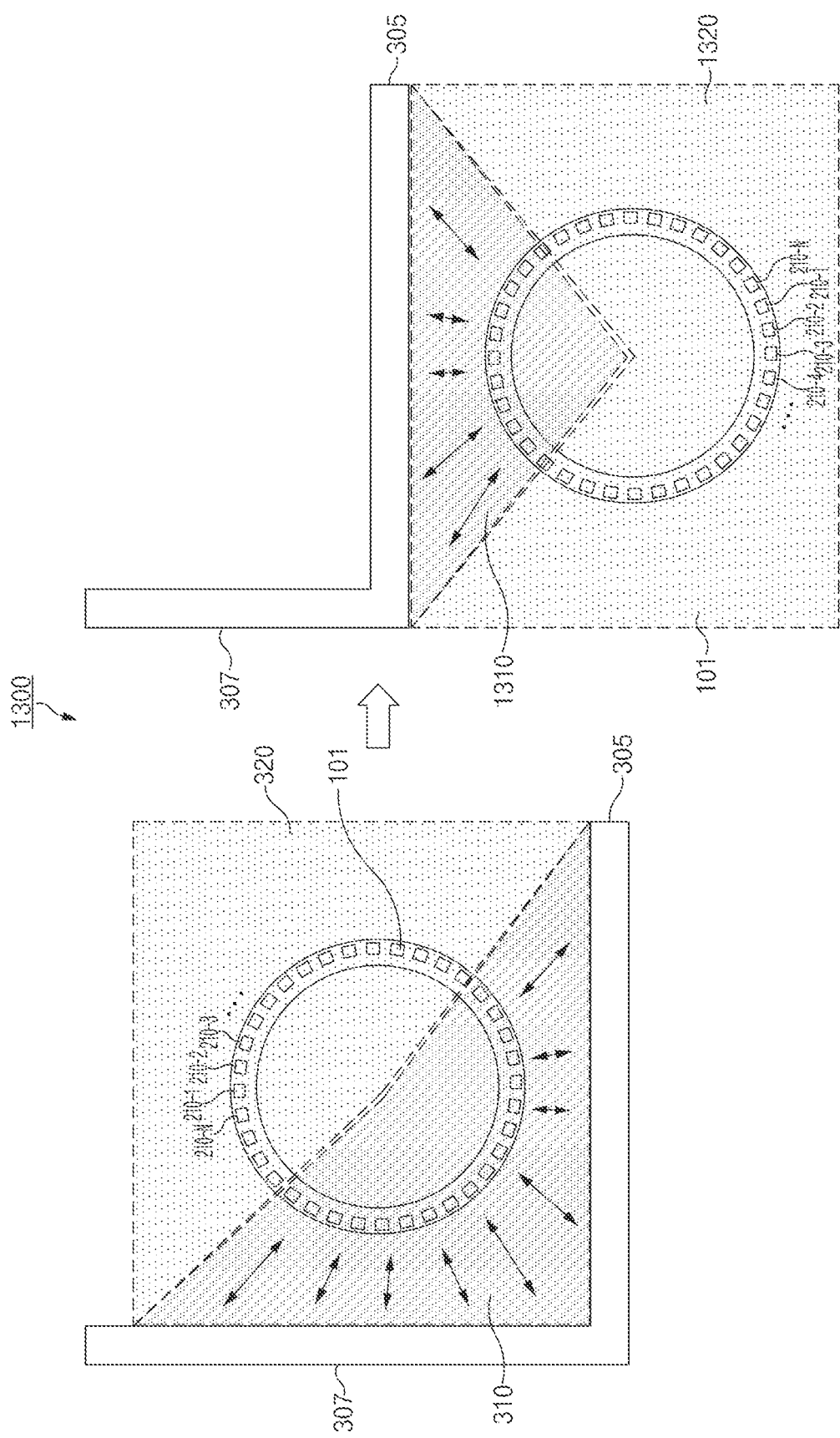
FIG. 13 illustrates an operation of an electronic device activating a plurality of antennas based on a location of an electronic device according to various embodiments.

FIG. 13 illustrates an operation of the electronic device 101 activating a plurality of antennas based on a location of the electronic device 101 according to various embodiments.

Referring to FIG. 13, the location of the electronic device 101 may be changed in a network environment 1300 (e.g., the network environment 300 of FIG. 3). For example, the electronic device 101 located on one side (e.g., topside) of the first object 305 and on one side (e.g., a right side) of the second object 307 may move to another side (e.g., a bottom side) of the first object 305. The electronic device 101 may detect that the location of the electronic device 101 is changed using at least one sensor 276 included in the electronic device 101. For another example, the electronic device 101 may detect a change in a plurality of directions, which the plurality of antennas (210-1, 210-2, . . . , 210-N) face, using at least one sensor 276. The electronic device 101 may re-determine a plurality of states in response to detecting that the location or direction of the electronic device 101 is changed. For example, the electronic device 101 may detect that the first wall surface 305 is present at a proximity distance to the electronic device 101, and may deactivate antennas corresponding to the direction (e.g., an inactive region 1310) in which the first wall surface 305 is present. The electronic device 101 may detect a user by activating antennas corresponding to a direction (e.g., an active region 1320) in which an external object is not present at a proximity distance.

Figure 14:
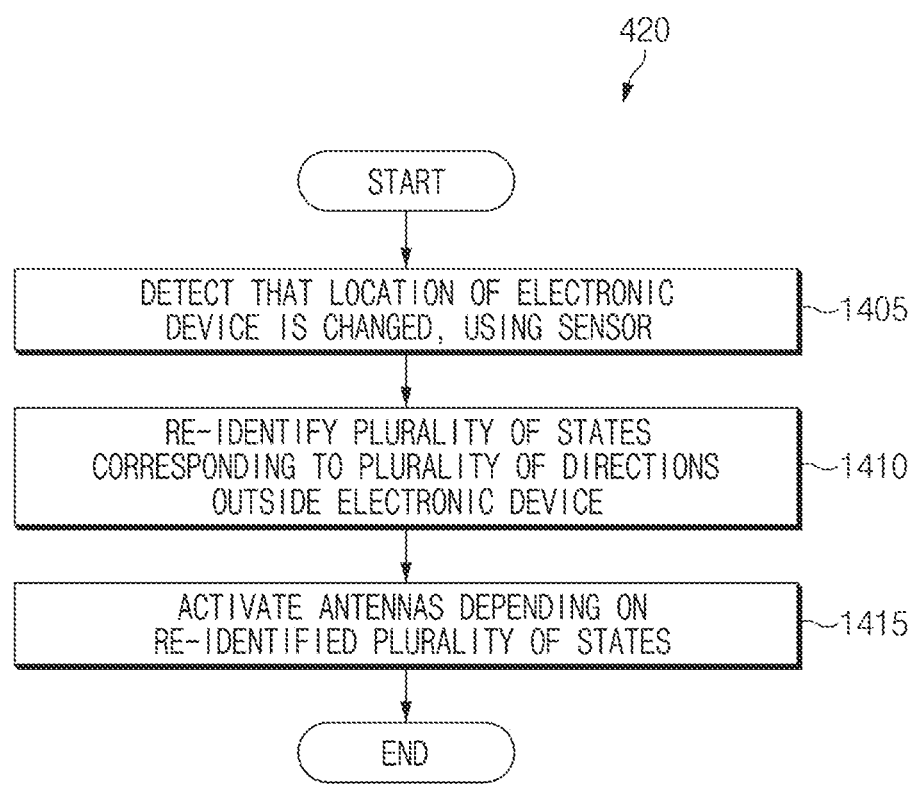
FIG. 14 illustrates a flowchart of an operation of an electronic device activating a plurality of antennas based on a location of an electronic device according to various embodiments.

FIG. 14 illustrates a flowchart of an operation of the electronic device 101 activating a plurality of antennas based on a location of the electronic device 101 according to various embodiments. The operations illustrated in FIG. 14 may mean operations obtained by performing operation 420 of FIG. 4 in detail.

Referring to FIG. 14, in operation 1405, the electronic device 101 may detect that the location of the electronic device 101 is changed, using at least one sensor 276 through the control circuit 220. For example, the at least one sensor 276 may include an acceleration sensor or a gyro sensor.

In operation 1410, the electronic device 101 may re-identify a plurality of states corresponding to a plurality of directions outside the electronic device 101 through the control circuit 220. For example, the electronic device 101 may detect an external object by transmitting a signal based on UWB technology.

In operation 1415, the electronic device 101 may activate the antennas depending on the re-identified plurality of states, through the control circuit 220.

Figure 15:
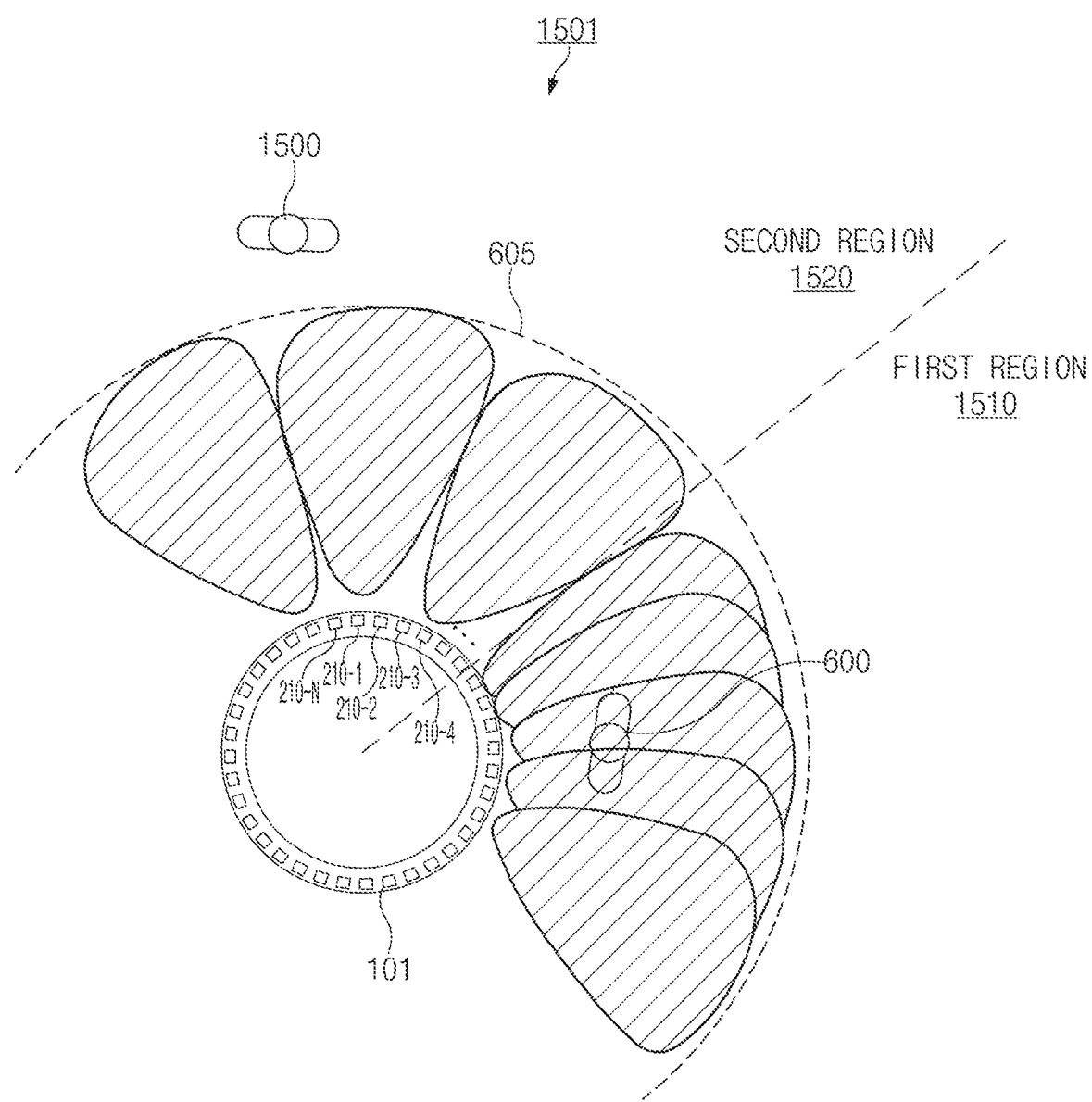
FIG. 15 illustrates an operation of adjusting a pattern of a beam generated by antennas to detect a plurality of users according to various embodiments.

FIG. 15 illustrates an operation of adjusting a pattern of a beam generated by antennas to detect a plurality of users 600 and 1500 according to various embodiments.

Referring to FIG. 15, in the network environment 1501 (e.g., the network environment 300 of FIG. 3), the electronic device 101 may control the operations of some antennas among activated second antennas differently from the operations of the remaining antennas. For example, for the second antennas corresponding to the region (e.g., a first region 1510) including the user 600 detected within the first threshold distance 605 to detect the user 600 in real time, the electronic device 101 may control the second antennas through the second operation 602; for the second antennas corresponding to the region (e.g., a second region 1520) where the user 600 is not detected, to detect another user (e.g., a user 1500), the electronic device 101 may control the second antennas through the first operation 601.

Through the above-described method, the electronic device 101 may simultaneously reduce power consumption required to detect a plurality of users while preventing the deterioration of tracking performance for detecting the previously detected user (e.g., the user 600).

Figure 16:
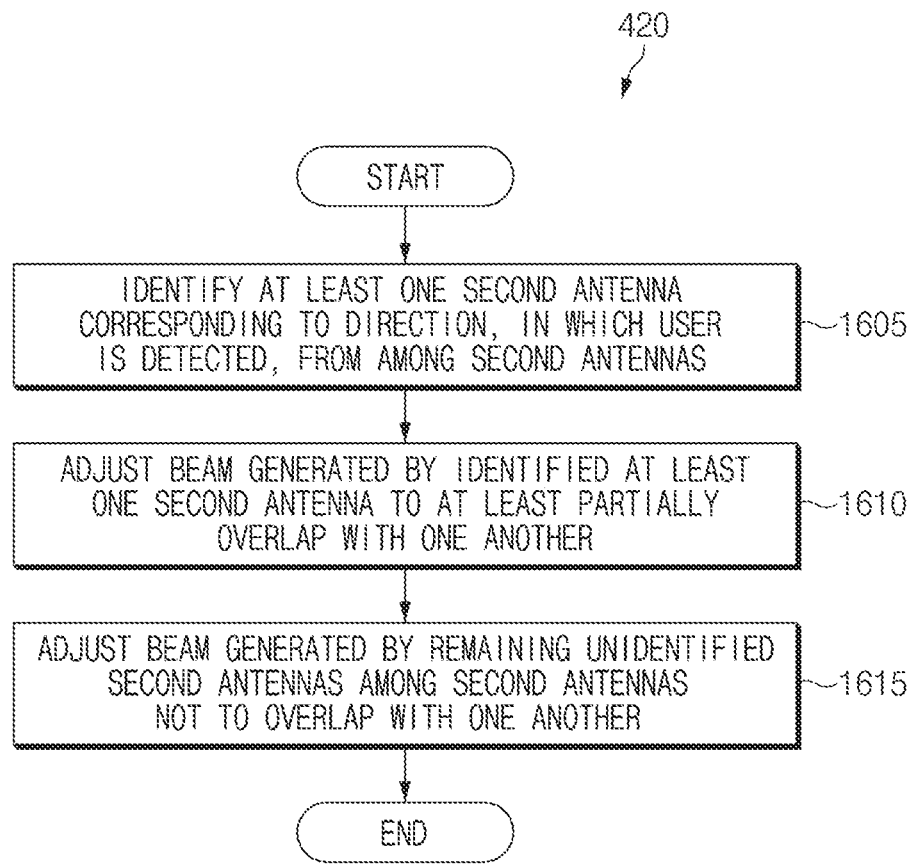
FIG. 16 is a flowchart illustrating an operation of an electronic device for adjusting a pattern of a beam generated by antennas to detect a plurality of users according to various embodiments.

FIG. 16 is a flowchart illustrating an operation of the electronic device 101 for adjusting a pattern of a beam generated by antennas to detect the plurality of users 600 and 1500 according to various embodiments. The operations illustrated in FIG. 16 may mean operations obtained by performing operation 420 of FIG. 4 in detail.

Referring to FIG. 16, in operation 1605, the electronic device 101 may identify at least one second antenna corresponding to a direction, in which the user 600 is detected, from among second antennas through the control circuit 220. For example, the electronic device 101 may identify at least one second antenna included in the first region 1510 of FIG. 15.

In operation 1610, the electronic device 101 may adjust the beam generated by the identified at least one second antenna through the control circuit 220 to at least partially overlap with one another. In other words, the electronic device 101 may control at least one second antenna to detect the user 600 through the second operation 602.

In operation 1615, the electronic device 101 may adjust the beam generated by the remaining unidentified second antennas among the second antennas through the control circuit 220 not to overlap with one another. In other words, the electronic device 101 may control the second antennas corresponding to the second region 1520 to detect another user through the first operation 601.

Figure 17:
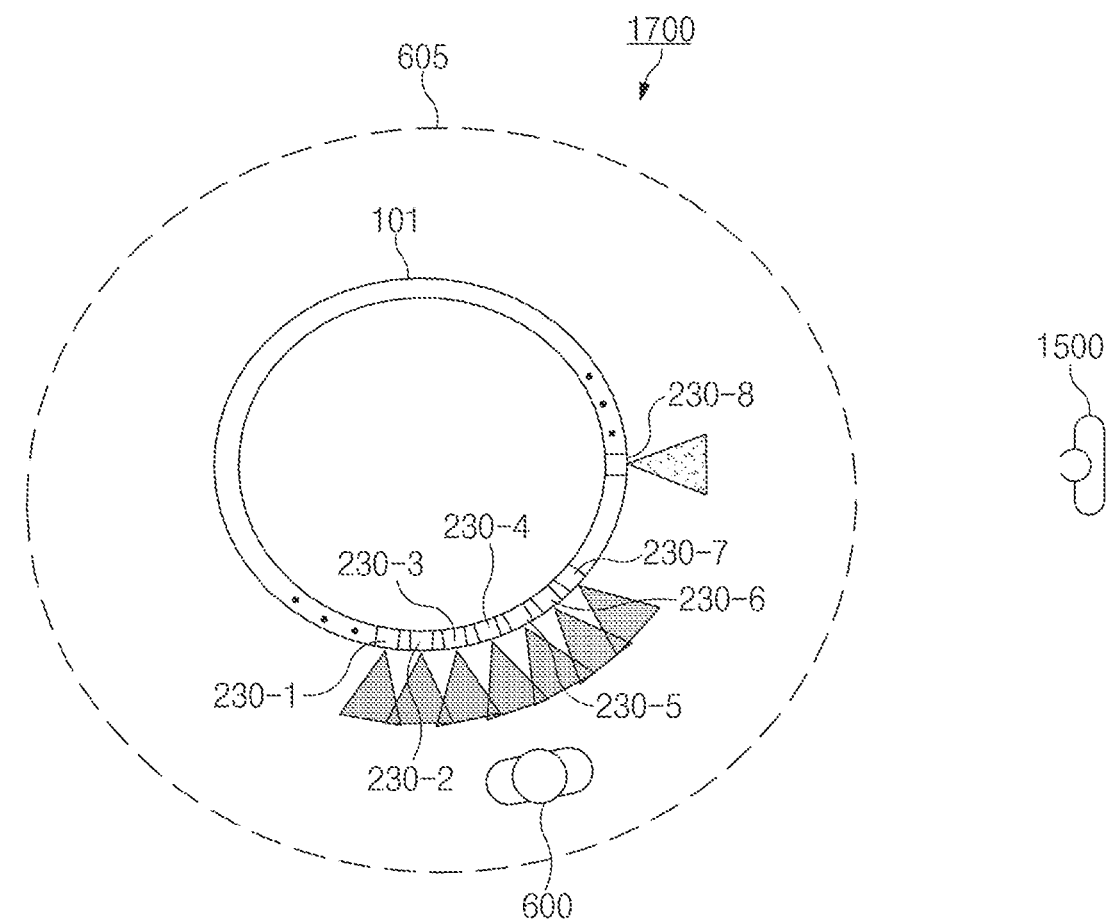
FIG. 17 illustrates an operation of outputting information associated with an operation of one or more antennas according to various embodiments.

FIG. 17 illustrates an operation of outputting information associated with an operation of one or more antennas according to various embodiments.

Referring to FIG. 17, in a network environment 1700 (e.g., the network environment 300 of FIG. 3), the electronic device 101 may output information associated with the operations of one or more antennas. For example, the information associated with an antenna may indicate which of the operations shown in Table 1 is being performed, and/or may indicate that the electronic device 101 currently detects the user 600 or 1500. According to an embodiment, the electronic device 101 may control the plurality of output devices (230-1, 230-2, . . . , 230-M) corresponding to a plurality of directions to output information associated with one or more antennas. For example, the information associated with an antenna may be output through at least one of Graphic User Interface (GUI), light, sound, or vibration.

For example, when the user 600 is detected within the first threshold distance 605, the electronic device 101 may output information through a plurality of output devices (e.g., 230-1, 230-2, 230-4, 230-4, 230-5, 230-6, and 230-7) to indicate that antennas corresponding to the detected direction generate a beam through the second operation 602. When information associated with the operation of an antenna includes light, the electronic device 101 may adjust the color of the output light or the number of output devices, based on the distance of the user 600. For another example, when the user 1500 is detected outside the first threshold distance 605, the electronic device 101 may output information through an output device 230-8 to indicate that antennas generate a beam through the first operation 601. Because the operation of the antenna (e.g., the second operation 602) performed to detect the user 600 is different from the operation (e.g., the first operation 601) of the antenna performed to detect the user 1500, the electronic device 101 may allow the user 600 or 1500 to recognize the operations of one or more antennas by changing the color, sharpness, or output period of the output light.

As described above, an electronic device (e.g., the electronic device 101 of FIG. 1) may include a plurality of array antennas (e.g., the plurality of antennas (210-1, 210-2, . . . , 210-N) of FIG. 2) (N is a natural number) disposed in a plurality of directions and a control circuit (e.g., the control circuit 220 of FIG. 2). The control circuit may be configured to determine a plurality of states corresponding to the plurality of directions outside the electronic device, using the plurality of array antennas, to deactivate the one or more first array antennas when states of one or more first array antennas among the plurality of states satisfy a first specified condition, and to activate the one or more second array antennas when states of one or more second array antennas among the plurality of states satisfy a second specified condition, and to detect an external object, using the one or more second array antennas in a state where the one or more first array antennas are deactivated.

According to an embodiment, the control circuit may be configured to transmit signals in the plurality of directions, using the plurality of antennas, to receive a signal reflected among the signals transmitted in the plurality of directions, and to determine the plurality of states based on at least one of whether the reflected signal is received within a threshold time, or whether a high-frequency signal is included in the reflected signal.

According to an embodiment, the control circuit may be configured to adjust beams generated by the second antennas not to overlap with one another when the external object is not detected within a specified first threshold distance, and to adjust beams generated by the second antennas to overlap with one another at least partially when the external object is detected within the first threshold distance.

According to an embodiment, the control circuit may be configured to adjust a detection angle of the second antennas to a first detection angle when an external object is not detected within the first threshold distance, and to adjust a detection angle of the second antennas to a second detection angle less than the first detection angle when the external object is detected within the first threshold distance.

According to an embodiment, the control circuit may be configured to adjust a detection angle of the second antennas to the first detection angle when the external object enters a place within a second threshold distance shorter than the first threshold distance.

According to an embodiment, the control circuit may be configured to adjust a detection angle of the second antennas to the first detection angle when a movement speed of the external object is not less than a threshold speed.

According to an embodiment, the control circuit may be configured to determine at least one second antenna corresponding to a direction, in which the external object is detected, from among the second antennas, to adjust beams generated by the determined at least one second antenna among the second antennas to overlap with one another at least partially, and to adjust beams generated by the remaining second antennas, which are not determined, from among the second antennas not to overlap with one another.

According to an embodiment, the electronic device may further include a plurality of output devices (e.g., the output device (210-1, 230-2, . . . , 230-M) (M is a natural number). The control circuit may be configured to output information associated with operations of one or more antennas among the plurality of antennas, using output devices corresponding to a direction, in which the external object is detected, from among the plurality of output devices.

As described above, a method of an electronic device (e.g., the electronic device 101 of FIG. 1) may include determining a plurality of states corresponding to the plurality of directions outside the electronic device, using a plurality of antennas, deactivating the one or more first antennas when states of one or more first antennas among the plurality of states satisfy a first specified condition, and activating the one or more second antennas when states of one or more second antennas among the plurality of states satisfy a second specified condition, and detecting an external object, using the one or more second antennas in a state where the one or more first antennas are deactivated.

According to an embodiment, the method may further include adjusting beams generated by the second antennas not to overlap with one another when the external object is not detected within a first threshold distance, and adjusting beams generated by the second antennas to overlap with one another at least partially when the external object is detected within the first threshold distance.

According to an embodiment, the method may further include adjusting a detection angle of the second antennas to a first detection angle when an external object is not detected within the first threshold distance, and adjusting a detection angle of the second antennas to a second detection angle less than the first detection angle when the external object is detected within the first threshold distance.

According to an embodiment, the method may further include adjusting a detection angle of the second antennas to the first detection angle when the external object enters a place within a second threshold distance shorter than the first threshold distance.

According to an embodiment, the method may further include adjusting a detection angle of the second antennas to the first detection angle when a movement speed of the external object is not less than a threshold speed.

According to an embodiment, the method may further include determining at least one second antenna corresponding to a direction, in which the external object is detected, from among the second antennas, adjusting beams generated by the determined at least one second antenna among the second antennas to overlap with one another at least partially, and adjusting beams generated by the remaining second antennas, which are not determined, from among the second antennas not to overlap with one another.

According to an embodiment, the method may further include outputting information associated with operations of one or more antennas among the plurality of antennas, using output devices corresponding to a direction, in which the external object is detected, from among the plurality of output devices.

As described above, an electronic device (e.g., the electronic device 101 of FIG. 1) may include a plurality of antennas (e.g., the plurality of antennas (210-1, 210-2, . . . , 210-N) of FIG. 2) (N is a natural number) arranged in a plurality of directions and a control circuit (e.g., the control circuit 220 of FIG. 2). The control circuit may be configured to detect an external object, using the plurality of antennas, to adjust beams generated by the plurality of antennas not to overlap with one another when the external object is not detected within a first threshold distance, and to adjust at least part of beams generated by the plurality of antennas to overlap with one another when the external object is detected within the first threshold distance.

According to an embodiment, the control circuit may be configured to adjust a detection angle of the plurality of antennas to a first detection angle when an external object is not detected within the first threshold distance, and to adjust a detection angle of the plurality of antennas to a second detection angle less than the first detection angle when the external object is detected within the first threshold distance.

According to an embodiment, the control circuit may be configured to adjust a detection angle of the plurality of antennas to the first detection angle when the external object enters a place within a second threshold distance shorter than the first threshold distance.

According to an embodiment, the control circuit may be configured to adjust a detection angle of the plurality of antennas to the first detection angle when a movement speed of the external object is not less than a threshold speed.

According to an embodiment, the control circuit may be configured to determine at least one second antenna corresponding to a direction, in which the external object is detected, from among the second antennas, to adjust beams generated by the determined at least one second antenna among the second antennas to overlap with one another at least partially, and to adjust beams generated by the remaining second antennas, which are not determined, from among the second antennas not to overlap with one another.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

The invention claimed is:

1. An electronic device comprising:
a plurality of antennas disposed in a plurality of directions; and
a control circuit, wherein the control circuit is configured to:
  determine a plurality of states corresponding to the plurality of directions outside the electronic device, using the plurality of antennas,
  in response to states of one or more first antennas among the plurality of states satisfying a first specified condition, deactivate the one or more first antennas, the first specified condition indicating a presence of a second external object at a distance that prevents a first external object from entering between the second external object and the electronic device, and
  in response to states of one or more second antennas among the plurality of states satisfying a second specified condition:
    activate the one or more second antennas, and
    detect the first external object, using the one or more second antennas in a state where the one or more first antennas are deactivated.

2. The electronic device of claim 1, wherein the control circuit is further configured to:
transmit signals in the plurality of directions, using the plurality of antennas;
receive a signal reflected among the signals transmitted in the plurality of directions; and
determine the plurality of states based on at least one of whether the reflected signal is received within a threshold time, or whether a high-frequency signal is included in the reflected signal.

3. The electronic device of claim 1, wherein the control circuit is further configured to:

in response to the first external object not being detected within a specified first threshold distance, adjust beams generated by the one or more second antennas not to overlap with one another; and in response to the first external object being detected within the first threshold distance, adjust the beams generated by the one or more second antennas to overlap with one another at least partially.

4. The electronic device of claim 3, wherein the control circuit is further configured to:
in response to the first external object not being detected within the first threshold distance, adjust a detection angle of the one or more second antennas to a first detection angle; and
in response to the first external object being detected within the first threshold distance, adjust the detection angle of the one or more second antennas to a second detection angle less than the first detection angle.

5. The electronic device of claim 4, wherein the control circuit is further configured to:
in response to the first external object entering a place within a second threshold distance shorter than the first threshold distance, adjust the detection angle of the one or more second antennas to the first detection angle.

6. The electronic device of claim 4, wherein the control circuit is further configured to:
in response to a movement speed of the first external object not being less than a threshold speed, adjust the detection angle of the one or more second antennas to the first detection angle.

7. The electronic device of claim 3, wherein the control circuit is further configured to:
determine at least one second antenna corresponding to a direction, in which the first external object is detected, from among the one or more second antennas;
adjust beams generated by the determined at least one second antenna among the one or more second antennas to overlap with one another at least partially; and
adjust beams generated by the remaining second antennas, which are not determined, from among the one or more second antennas not to overlap with one another.

8. The electronic device of claim 3, further comprising:
a plurality of output devices,
wherein the control circuit is further configured to:
output information associated with operations of at least one of antennas among the plurality of antennas, using output devices corresponding to a direction, in which the first external object is detected, from among the plurality of output devices.

9. A method of an electronic device, the method comprising:
determining a plurality of states corresponding to a plurality of directions outside the electronic device, using a plurality of antennas;
in response to states of one or more first antennas among the plurality of states satisfying a first specified condition, deactivating the one or more first antennas, the first specified condition indicating a presence of a second external object at a distance that prevents a first external object from entering between the second external object and the electronic device; and
in response to states of one or more second antennas among the plurality of states satisfying a second specified condition:
activating the one or more second antennas, and
detecting the first external object, using the one or more second antennas in a state where the one or more first antennas are deactivated.

10. The method of claim 9, further comprising:
in response to the first external object not being detected within a first threshold distance, adjusting beams generated by the one or more second antennas not to overlap with one another; and
when in response to the first external object being detected within the first threshold distance, adjusting beams generated by the one or more second antennas to overlap with one another at least partially.

11. The method of claim 10, further comprising:
in response to the first external object not being detected within the first threshold distance, adjusting a detection angle of the one or more second antennas to a first detection angle; and
in response to the first external object being detected within the first threshold distance, adjusting the detection angle of the one or more second antennas to a second detection angle less than the first detection angle.

12. The method of claim 11, further comprising:
in response to the first external object entering a place within a second threshold distance shorter than the first threshold distance, adjusting the detection angle of the one or more second antennas to the first detection angle.

13. The method of claim 11, further comprising:
in response to a movement speed of the first external object not being less than a threshold speed, adjusting the detection angle of the one or more second antennas to the first detection angle.

14. The method of claim 10, further comprising:
determining at least one second antenna corresponding to a direction, in which the first external object is detected, from among the one or more second antennas;
adjusting beams generated by the determined at least one second antenna among the one or more second antennas to overlap with one another at least partially; and
adjusting beams generated by the remaining second antennas, which are not determined, from among the one or more second antennas not to overlap with one another.

15. The method of claim 10, further comprising:
outputting information associated with operations of one or more antennas among the plurality of antennas, using output devices corresponding to a direction, in which the first external object is detected, from among a plurality of output devices.

16. The method of claim 10, wherein the second external object comprises at least one of a wall or a barrier.

* * * * *